United States Patent [19]

Hughes et al.

[11] Patent Number: 4,792,578

[45] Date of Patent: Dec. 20, 1988

[54] RESIN-BONDED TAPHOLE MIX

[75] Inventors: Gustav O. Hughes, Dravosburg; George H. Criss, Bethel Park, both of Pa.

[73] Assignee: Dresser Industries, Inc., Dallas, Tex.

[21] Appl. No.: 919,352

[22] Filed: Oct. 16, 1986

[51] Int. Cl.$^4$ ............................ C08K 3/34; C08K 3/22
[52] U.S. Cl. ................................... 523/140; 524/377
[58] Field of Search .......................... 523/140; 524/377

[56] References Cited

U.S. PATENT DOCUMENTS

| | | | |
|---|---|---|---|
| 4,072,531 | 2/1978 | Funabiki et al. | 523/140 |
| 4,082,718 | 4/1978 | Ando et al. | 523/140 |
| 4,261,878 | 4/1981 | Hirose et al. | 523/140 |

FOREIGN PATENT DOCUMENTS

| | | | |
|---|---|---|---|
| 54-132617 | 10/1979 | Japan | 523/140 |
| 54-150412 | 11/1979 | Japan | 523/140 |
| 2096984 | 12/1982 | United Kingdom | 523/140 |

*Primary Examiner*—Lewis T. Jacobs
*Attorney, Agent, or Firm*—Sigalos & Levine

[57] ABSTRACT

A slow setting resin-bonded taphole mix consisting essentially of a uniform admixture of a refractory grog and a bonding composition consisting essentially of a low volatile high softening point phenolic resin, a high boiling point for said resin, and a clay, and the method of using said mix to seal tapholes.

9 Claims, No Drawings

RESIN-BONDED TAPHOLE MIX

BACKGROUND OF THE INVENTION

The present invention relates to taphole mixes for use in metal-making furnaces and particularly large production blast furnaces.

At the present time variety of refractory materials are utilized to seal tapholes in such furnaces but have not been found to be satisfactory, particularly for high temperature extrusion. Most satisfactory to date have been those refractory grogs wherein the grog is bonded by a combination of clay and either pitch or creosote. While pitch and creosote bonded grogs for use as taphole mixes are operable, they are not entirely satisfactory in that they give off toxic fumes and accordingly are hazardous to use. Moreover, the pitch and/or creosote bonded refractory grogs are more difficult to remove from the taphole; as by drilling, after use.

Attempts to overcome this problem by using resin-bonded refractory grogs have not proven successful for a variety of reasons. Amongst other reasons, they are more costly than the pitch and creosote, set too rapidly, and have insufficient hot strength after the taphole mix is put into place, thus effectively precluding their use in large production blast furnaces in which high temperatures are attained.

SUMMARY OF THE INVENTION

The resin-bonded taphole mix of the present invention overcomes the problems of the prior art to provide a low cost, effective, non-toxic, high temperature extrudable mix suitable for use in metal-making furnaces, including high temperature blast furnaces.

Briefly, the present invention comprises a slow setting resin-bonded taphole mix consisting essentially of a substantially uniform admixture of a refractory grog and a bonding composition consisting essentially of a clay, a low volatile high softening point phenolic resin, and a high boiling point solvent. The invention also comprises the method of closing a taphole comprising applying to said taphole the foregoing mix and curing said mix.

DETAILED DESCRIPTION

The two essential components of the present invention are the refractory grog and the bonding composition. As to the refractory grog, it can be any alumina, grog, silica grog, calcined fire clay grog, pyropholite grog, fused alumina grog, fused mullite grog, sintered alumina grog, or mixture thereof presently used in taphole mixes. Conventionally, these grogs also contain materials to give increased slag resistance such as silicon carbide, graphite, or other carbon forms or mixtures thereof.

In the present invention, it is preferred to use a grog consisting essentially of alumina-silica calcines, fused alumina with silicon carbide and graphite.

The proportions by weight of the various components in the grog in the present invention are not critical so long as the components are present in amounts sufficient to give the strength and other properties required for the particular conditions of the metalmaking furnace in which the taphole mix is to be utilized. For high temperature use; such as blast furnaces, it is also in some cases advisable to add silicon in an amount sufficient to increase the mix's hot strength after cure; although this does add to cost. The amount of silicon added will vary dependent upon the particular grog used, but is suitably about 1.5 to 3 parts by weight for each 100 parts by weight of the refractory grog and clay in the mix.

With respect to the bonding composition, clay has been utilized in the past together with the creosote or pitch for bonding purposes and it is again utilized for this same purpose. The novelty of the present invention is to utilize a low volatile high softening point phenolic resin and a high boiling point solvent for said resin which is compatible therewith. As previously noted, resins have not been satisfactory before since resin bonds and systems set up so much faster than pitch-creosote systems that it precluded their use from large production blast furnaces where high temperatures are utilized.

As to the clay used in the bonding composition, it can be any conventionally used for that purpose such as ball clays, bentonites, and the like and mixtures thereof.

The two critical elements in the bonding composition are the phenolic resin and the high boiling point solvent therefor. It is preferred to use a solid rein; most suitably a powdered one, although predissolved resins can also be used. The powdered phenolic resin must have, as noted, low volatiles and high softening point. Suitable for this purpose are the novolac resins with softening points above about 220° F.; such as RD 2477 from BORDEN INC.

With respect to the solvent, it must not only be compatible with the resin, but have a boiling point above about 550° F., particularly when being utilized in high temperature blast furnaces. Most suitable for this purpose is triethylene glycol; although other solvents such as tetraethylene glycol and the like, or mixtures thereof can be utilized.

As to proportions, while large amounts of resin, such as 12% by weight based on 100 percent by weight of the mix (refractory grog, clay, and silicon (if any)) can be utilized, from a cost viewpoint, as well as effectiveness, it has been found that amounts as low as 4% can be utilized, although it is preferred to utilize from about 6% to 8% by weight. Correspondingly, larger amounts of the solvent would be required with the larger amounts of resin, but solvent also can be utilized in an amount preferably from 8% to 11% by weight, although amounts from about 7% to 15% can be utilized.

The invention will be further illustrated in connection with the following examples which are set forth for purposes of illustration only. In these examples, the workability index, green bulk density, cold and hot crush strength, drip slag test and extrusion pressure testing are determined utilizing the conventional apparatus and procedures for that purpose in testing taphole mixes. Also, the proportions of materials in the mix is in percent by weight, with the plus additions; resin and solvent, being based on 100% by weight of the mix.

EXAMPLES 1-4

A series of mixes was prepared by admixing in the conventional manner various refractory grogs and utilizing a typical pitch bonding in one mix and a phenolic resin and solvent therefor as the bonding agent for the other mixes. The various components of the mixes and the results of the tests thereon are shown in Table I below.

TABLE I

| Mix Designation: | EXAMPLES | | | |
|---|---|---|---|---|
| | 1 | 2 | 3 | 4 |
| Mix: | | | | |
| Calcined Fire Clay Grain - (Mo. Flint Grain) | | | | |
| 3/10 mesh | | | 18% | |
| 10/28 | | | 16 | |
| 28/65 | | | 6 | |
| Ball Mill Fines (BMF) | 32 | 32 | 29.5 | 27 |
| Crude Kyanite (−100 mesh) | | | 10 | |
| P-Carb | | | 3 | |
| Amorphous Graphite (MEXALOY) | | | 5 | |
| Ball Clay (GLEASON) | 10 | 10 | 12.5 | 15 |
| Plus Additions: | | | | |
| Powdered Pitch | 10.5 | — | — | — |
| Methyl Napthaline | 10.5 | — | — | — |
| Powdered Phenolic Resin (BORDEN RD 2477) | — | 8 | 8 | 8 |
| Triethylene Glycol | — | 9.5 | 9.5 | 10 |
| Mix Temperature, °F.: | 117 | 104 | 107 | 116 |
| Workability Index: | 47 | 25 | 24 | 28 |
| Extrusion Pressure at 300° F. | | | | |
| To initiate flow: | 50 | 30 | 50 | 40 |
| To maintain flow: | 90 | 40 | 60 | 50 |
| Cold Crushing Strength, kPa After drying at 500° F. (Av 3): | 6330 | 8530 | 12110 | 10600 |
| Weight Loss, % After Heating at 500° F. (Av 3): | 6.9 | 4.5 | 4.8 | 5.4 |
| Reheat Change after 30 min at 2000° F., Reducing | | | | |
| Linear Change, Ht, %: | +1.5 | +0.1 | +2.4 | +1.7 |
| Linear Change, Dia., %: | +3.6 | +5.5 | +4.8 | +4.3 |
| Weight Loss, %: | 14.2 | 14.5 | 14.3 | 14.5 |
| Hot Crushing Strength at 2000° F., psi: (load rate was 400 lbs/min) | 760 | 750 | 820 | 660 |
| Drip Slag Test at 2900° F. using 500 g of Duquesne BF Slag (Reducing) Volume loss, cc: | 50 | 59 | — | — |

EXAMPLES 5-11

The procedures of Examples 1 to 4 were followed but using different grogs and different proportions of resin and solvent. The results are set forth in Table II below.

TABLE II

| Mix Designation: | EXAMPLES | | | | | | |
|---|---|---|---|---|---|---|---|
| | 5 | 6 | 7 | 8 | 9 | 10 | 11 |
| Mix: | | | | | | | |
| Calcined Alumina-silica (Ucal 60) | | | | | | | |
| 3/10 mesh | | | | 12% | | | |
| 10/28 mesh | | | | 11 | | | |
| 28/65 mesh | | | | 5 | | | |
| BMF | 25 | 27 | 30 | 32 | 29.5 | 32 | 27 |
| Silicon Carbide (DCF) | 15 | 15 | 10 | 10 | 10 | 10 | 15 |
| Crude Kyanite (−100 m) | | | | 10 | | | |
| Amorphous Graphite (MEXALOY) | 7.5 | 7.5 | 7.5 | 7.5 | 10 | 7.5 | 7.5 |
| Silicon (−100 m) | 2 | — | 2 | — | — | — | — |
| Ball Clay (GLEASON) | | | | 12.5 | | | |
| Plus Additions: | | | | | | | |
| Phenolic Resin (BORDEN RD 2477) | 8 | 8 | 8 | 8 | 8 | 6 | 6 |
| Triethylene Glycol | 10.25 | 10.25 | 10.25 | 10.01 | 10.0 | 10.25 | 10.25 |
| Mixing Time, min: | 8 | 8 | 7 | 6 | 6 | 10 | 8 |
| Mix Temperature, °F.: | 110 | 114 | 119 | 117 | 122 | 111 | 115 |
| Workability Index (14 lb weight): | 25 | 27 | 29 | 31 | 25 | 22 | 21 |
| Green Bulk Density, pcf (Av 3): | 143 | 143 | 143 | 144 | 142 | 145 | 145 |
| Cold Crushing Strength, psi After Curing 6 hours at 500° F. (Av 3): | 2200 | 18200 | 19400 | 17800 | 17300 | 14000 | 14100 |
| Hot Crushing Strength, psi At 2000° F.: | 1200 | 800 | 1000 | 570 | 790 | 980 | — |
| Drip Slag Testing at 2800° F. Using 1000 gms Duquesne BF | 11 | — | — | — | — | 21 | — |

TABLE II-continued

| Mix Designation: | EXAMPLES | | | | | | |
|---|---|---|---|---|---|---|---|
| | 5 | 6 | 7 | 8 | 9 | 10 | 11 |
| slag, Reducing Volume Eroded, cu cm: | | | | | | | |
| Extrusion Pressure, psi 300° F., 2 hour hold | | | | | | | |
| Initial: | 50 | — | — | — | — | 120 | — |
| Hold: | 380 | — | — | — | — | 520 | — |
| Raw Stock Cost, $/ton: | 396 | 366 | 369 | 339 | 344 | 314 | 342 |

In all instances with the resin-bonded products of the present invention there was lower fuming, none of the toxicity that is present with pitch and creosote, as well as the ability to have high temperature extrusion. Also the mix of the present invention extrudes easier and more quickly at all temperature levels thus resulting in lower strain in the mud gun used to apply the mix to the taphole.

Moreover, the resin-bonded mixes were softer and acted to plug up any cracks appearing in the taphole. Moreover, the resin was easier to clean out and drill out than with the pitch or creosote bonded resins.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A slow setting resin-bonded taphole mix consisting essentially of substantially uniform admixture of a refractory grog and a bonding composition consisting essentially of a low volatile high softening point phenolic resin, a solvent having a boiling point above about 550° F. for said resin, and a clay.

2. The taphole mix of claim 1, wherein for each 100 percent by weight of refractory grog and clay in the mix there is present from about 4 to 12% by weight of said resin and correspondingly from about 7 to 15% by weight of said solvent.

3. The taphole mix of claim 1 or 2, wherein said resin is a novolac resin having a softening point above about 220° F.

4. The taphole mix of claim 1 or 2, wherein said resin is a powdered novolac resin having a softening point above about 220° F. and said solvent is selected from triethylene glycol, tetraethylene glycol, or mixtures thereof; for each 100 percent by weight of refractory grog and clay in the mix there being present from about 6 to 8% by weight of said resin and correspondingly 8 to 11% by weight of said solvent.

5. The taphole mix of claim 1 or 2, wherein said refractory grog consists essentially of alumina-silica calcines, fused alumina, silicon carbide, and graphite.

6. The taphole mix of claim 1 or 2 wherein said mix includes silicon in an amount sufficient to increase the hot strength after cure.

7. A slow setting resin-bonded taphole mix consisting essentially of a substantially uniform admixture of:
   (a) a refractory grog consisting essentially of alumina-silica calcines, fused alumina, silicon carbide, and graphite;
   (b) a bonding composition consisting essentially of a powdered phenolic novolac resin having a softening point above about 220° F., triethylene glycol, and ball clay; and
   (c) there being present in said mix for each 100 percent by weight of said grog and clay from about 6 to 8% by weight of said resin and about 8 to 11% by weight of said triethylene glycol.

8. A method of sealing a taphole in a metal-making furnace comprising applying the mix of claims 1, 2, or 7 to said taphole and curing said mix to seal said taphole.

9. The method of claim 8, wherein said furnace is a large production blast furnace.

* * * * *

UNITED STATES PATENT AND TRADEMARK OFFICE
CERTIFICATE OF CORRECTION

PATENT NO. : 4,792,578

DATED : Dec. 20, 1988

INVENTOR(S) : Hughes et al.

Page 1 of 2

It is certified that error appears in the above-identified patent and that said Letters Patent is hereby corrected as shown below:

In the ABSTRACT, line 5, after "point", insert -- solvent --

Column 1, line 9, insert -- a -- before "variety.

Column 2, line 24, "rein" should be -- resin --.

Columns 3 and 4, Table I, the percentages of the various mesh sizes of fire clay grain apply as to all of the Examples 1 to 4 as does the percent of Kyanite, P-Carb, and Amorphous Graphite. Also, the entries for the Drip Slag Test in terms of volume loss for the four examples should be in the last line of the table where the term "Volume loss, cc:" is set forth and not in the line headed "Drip Slag Test at 2900°F. using".

Columns 3 and 4, Table II, the percentages of the various mesh sizes of the Calcined Alumina-silica apply to to all of Examples 5 to 11 as does the percent Ball Clay. Also, the entries for the line headed "Drip Slag Testing at 2800°F" are to be deleted and inserted along the line headed "Volume Eroded, cu cm:" that appeals in Table II-continued, in columns 5 and 6.

UNITED STATES PATENT AND TRADEMARK OFFICE
CERTIFICATE OF CORRECTION

PATENT NO. : 4,792,578
DATED : Dec. 20, 1988
INVENTOR(S) : Hughes et al.

It is certified that error appears in the above-identified patent and that said Letters Patent is hereby corrected as shown below:

Claim 1, line 2, before "substantially", insert --a--.

Signed and Sealed this

Twenty-third Day of May, 1989

Attest:

DONALD J. QUIGG

*Attesting Officer*    *Commissioner of Patents and Trademarks*